United States Patent
Breitenbacher

(10) Patent No.: US 10,909,243 B2
(45) Date of Patent: Feb. 2, 2021

(54) NORMALIZING ENTRY POINT INSTRUCTIONS IN EXECUTABLE PROGRAM FILES

(71) Applicant: Avast Software s.r.o., Prague (CZ)

(72) Inventor: Zdeněk Breitenbacher, Brno (CZ)

(73) Assignee: Avast Software s.r.o., Prague (CZ)

( * ) Notice: Subject to any disclaimer, the term of this patent is extended or adjusted under 35 U.S.C. 154(b) by 110 days.

(21) Appl. No.: 16/022,587

(22) Filed: Jun. 28, 2018

(65) Prior Publication Data

US 2019/0005238 A1    Jan. 3, 2019

Related U.S. Application Data

(60) Provisional application No. 62/526,994, filed on Jun. 29, 2017.

(51) Int. Cl.
  *G06F 21/00*  (2013.01)
  *G06F 21/56*  (2013.01)
  *G06F 8/41*   (2018.01)

(52) U.S. Cl.
  CPC .......... *G06F 21/563* (2013.01); *G06F 8/427* (2013.01); *G06F 8/437* (2013.01); *G06F 8/4435* (2013.01); *G06F 21/568* (2013.01)

(58) Field of Classification Search
  CPC combination set(s) only.
  See application file for complete search history.

(56) References Cited

U.S. PATENT DOCUMENTS

| 6,073,239 A * | 6/2000 | Dotan ................. G06F 21/52 713/188 |
| 6,164,841 A * | 12/2000 | Mattson, Jr. ....... G06F 9/45504 716/103 |
| 8,782,435 B1 * | 7/2014 | Ghose ................ G06F 9/3834 713/190 |
| 9,900,324 B1 * | 2/2018 | Barua ............... H04L 63/1433 |
| 2005/0172338 A1 | 8/2005 | Sandu et al. |
| 2005/0223238 A1 * | 10/2005 | Schmid .............. G06F 21/563 713/188 |
| 2012/0174227 A1 * | 7/2012 | Mashevsky ........ G06F 21/562 726/24 |

(Continued)

FOREIGN PATENT DOCUMENTS

| EP | 1762957 A1 | 3/2007 |
| EP | 3159823 A1 | 4/2017 |

OTHER PUBLICATIONS

Charland et al., Clone Search for Malicious Code Correlation, ATO RTO Symposium on Information Assurance and Cyber Defense (IST-111), 2012, 12 pages, Koblenz, Germany.

(Continued)

*Primary Examiner* — Josnel Jeudy
(74) *Attorney, Agent, or Firm* — Erickson Kernell IP, LLC

(57) ABSTRACT

Systems and methods for normalizing entry point instructions include receiving a scope of instructions starting at an entry point of executable code. For each instruction in the scope of instructions, a determination is made if the instruction performs an ineffective operation or if the instruction, in combination with another instruction, renders either or both instructions ineffective. Ineffective instructions are filtered such that they do not appear in an output buffer.

21 Claims, 12 Drawing Sheets

(56) References Cited

U.S. PATENT DOCUMENTS

| | | | | |
|---|---|---|---|---|
| 2014/0181976 A1* | 6/2014 | Snow | ................... | G06F 21/566 |
| | | | | 726/23 |
| 2015/0277880 A1* | 10/2015 | Gschwind | ................ | G06F 8/52 |
| | | | | 717/159 |
| 2015/0370560 A1* | 12/2015 | Tan | .................... | G06F 9/30058 |
| | | | | 717/148 |
| 2018/0183814 A1* | 6/2018 | Sambandam | ......... | G06F 21/565 |
| 2018/0268130 A1* | 9/2018 | Ghosh | ................ | G06F 9/45558 |

OTHER PUBLICATIONS

Barr et al., Matching Global Data References in Related Executables, 2007, 11 pages, http://citeseerx.ist.psu.edu/viewdoc/download?doi=10.1.1.138.8506&rep=rep1&type=pdf. Accessed Sep. 26, 2018.

Preda et al. A Semantics-Based Approach to Malware Detection, ACM SIGPLAN—SIGACT Symposium on Principles of Programming Languages, Jan. 17-19, 2007, pp. 377-388, Nice, France.

Christodorescu et al., Malware Normalization, Nov. 30, 2005, 17 pages, http://flp.cs.wisc.edu/pub/techreports/2005/TR1539pdf. Retrieved Jan. 16, 2008.

* cited by examiner

FIG. 5

```
8925-------EB---EB---EB---6A--FB3C--53F51620EB033BEB---EB---E8--------------EB---6A--F83C--8925-------------------EB---F705-------------------
EB--FF148925-------EB--2803C968--------------64FF35--------------C705------EB---E8-----------------------2003BECEB--CD---EB---CD---8B---
8925-------EB--69B1-------------------------------64FF35--------EB--80C2---4BEB--6A--FB3C---------EB----EB--01EB89E58B45--8B003D---------75---
8925-------68-------64FF35-----------00000064892S-------------EB--9370--4D55EB---C705--------------------------------8D1276--EB--52388B-------033D---
8925-------68-------EB--80D9--FF35--------------EB--23046489205-------------------------------------------EB---8327--89E573--9073--72--24--01028B45--8B00
8925-------68-------64FF35----------------------64892S------------------------------------------------EB----EB---8B45--8B00EB---C705-------------
8925-------68-------EB----EB--B2--FF35----------6489205-------------EB--D2E2EB---EB--69B1-----------EB----EB---8B45--8B003D-----------75---EB---69B1-------
8925-------68-------7D--908D097C--EB--3ED064FF--0000000648925-------EB--A6AC28EB48EB---80E0--89E58B45--8B003D-----------75---EB---69B1-------
8925-------68-------64FF35----------------------64892S-------------EB--5589E5EB--80E9--4508EB03EBFAB4--003D-----------75---EB-------
8925-------68-------EB--80F4--FF35--------------6489205------------------------------00EB02FF14--0300080----------75---EB--81E8-------
8925-------68-------64FF35----------------------6489205------------89E5EB--FF1455---------EB--8F41--4508EB02FF27EB--8D268B00EB---
8925-------68-------EB--64FF35------7D--8D3F7C--EB---6489205------------------EB----EB---81C7---2AC905-------------EB---E5---04---EB---3C--45088B---
8925-------68-------EB--4B74--FF35--------------6489205------------EB---EB--5589E5EB--23048B450888-------16EB--8FC53D----------EB--FF1475-------
8925-------68-------EB--230464FF35--------------6489205------------EB---EB---CD--8BECEB---FF15---02C7858B
EB---E8----------5600EB013368-----------------64FF35--------EB---EB--8155-----------EC8B45--EB--D78B003D----------75---33C0EB---3D---
8925-------EB--29E405-----------EB--------BF----FF35----------EB--------415380EB---0283-------------------
8925-------68-------EB--81FB--------------000000064892S-------EB--4E74--8925---------EB---B1--89E5EB--33C9A1---02C705--------B7--0300---
8925-------EB--FF15--------00EB0381--------35---------EB--80F4--8925-------EB---80FC---5CEB---EB--6A--FB3C--E5--4508EB0283-----02---
8925-------68-------EB--8B0964FF35-------EB--FF15-------000000EB0331C9A0-------E5---0381----08EB01BC8B--------0080---
```

```
8925---68---64FF35---648925---5589E581EC---C745---C745---C645---C745---817D---C745---8D1B8B55---8955---8B45---0FAF45---8945---C745---8B4D---0FAF
8925---68---64FF35---648925---5589E581EC---C745---C745---C645---C745---817D---C745---8B55---8955---8B45---0FAF45---8945---C745---8B4D---0FAF
8925---68---64FF35---558BEC83EC---C745---C745---C645---C745---817D---C745---8B55---8955---8B45---0FAF45---8945---C745---8B4D---0FAF
```

FIG. 9

| Bytes | Mnemonic | Operands | Offset |
|---|---|---|---|
| EB02 | jmp | 0x005E4F24 | +001 |
| FF1489 | call | dword [ecx+ecx*4] | |
| 892510365E00 | mov | dword [0x005E3610], esp | |
| EB03 | jmp | 0x005E4F2F | +002 |
| 2803 | sub | byte [ebx], al | |
| C9 | leave | | |
| 684F4F5E00 | push | 0x005E4F4F | |
| 64FF3500000000 | push | dword fs:[0x00000000] | |
| 64892500000000 | mov | dword fs:[0x00000000], esp | |
| EB01 | jmp | 0x005E4F45 | +003 |
| E8EB61EB02 | call | 0x03498134 | +031 |
| EB61 | jmp | 0x005E4FA8 | +019 |
| EB02 | jmp | 0x005E4F4B | +004 |
| C705EB02CD2055EB03CD | mov | dword [0x20CD02EB], 0xCD03EB55 | |
| EB02 | jmp | 0x005E4F4F | +005 |
| CD20 | int | 0x20 | |
| 55 | push | ebp | |
| EB03 | jmp | 0x005E4F55 | +006 |
| CD20 | int | 0x20 | |
| 038BECEB02CD | add | ecx, dword [ebx+0xCD02EBEC] | |
| 8BEC | mov | ebp, esp | |
| EB02 | jmp | 0x005E4F5B | +007 |
| CD20 | int | 0x20 | |
| EB02 | jmp | 0x005E4F5F | +008 |
| CD20 | int | 0x20 | |
| 8B4508 | mov | eax, dword [ebp+0x08] | |
| E801 | jmp | 0x005E4F65 | +009 |
| E888003D03 | call | 0x039B4FF4 | +032 |
| 8B00 | mov | eax, dword [eax] | |
| 3D03000080 | cmp | eax, 0x80000003 | |
| EB03 | jmp | 0x005E4F71 | +010 |
| 108FA2750FEB | adc | byte [edi+0xEB0F75A2], cl | |
| 750F | jne | 0x005E4F82 | +013 |
| EB01 | jmp | 0x005E4F76 | +011 |
| 2A33 | sub | dh, byte [ebx] | |
| 33C0 | xor | eax, eax | |
| EB01 | jmp | 0x005E4F7B | +012 |
| E5EB | in | eax, 0xEB | |
| EB25 | jmp | 0x005E4FA2 | +017 |
| EB03 | jmp | 0x005E4F82 | +013 |
| CD20 | int | 0x20 | |
| EB3D | jmp | 0x005E4FC0 | +022 |
| 3D04000080 | cmp | eax, 0x80000004 | |
| EB03 | jmp | 0x005E4F8C | +014 |
| 2017 | and | byte [edi], dl | |
| 52 | push | edx | |
| 750C | jne | 0x005E4F9A | +016 |
| 33C0 | xor | eax, eax | |
| EB02 | jmp | 0x005E4F94 | +015 |
| FF14EB | call | dword [ebx+ebp*8] | |
| EB0C | jmp | 0x005E4FA2 | +017 |
| EB02 | jmp | 0x005E4F9A | +016 |
| FF15B8010000 | call | dword [0x000001B8] | |
| B801000000 | mov | eax, 0x00000001 | |
| EB01 | jmp | 0x005E4FA2 | +017 |
| C45DEB | les | ebx, [ebp-0x15] | |
| 5D | pop | ebp | |
| EB02 | jmp | 0x005E4FA7 | +018 |
| B771 | mov | bh, 0x71 | |
| C3 | ret | | |
| EB03 | jmp | 0x005E4FAD | +020 |
| CD20 | int | 0x20 | |
| EB55 | jmp | 0x005E5003 | +030 |
| 55 | push | ebp | |
| 8BEC | mov | ebp, esp | |
| 83EC64 | sub | esp, 0x64 | |
| C745F810000000 | mov | dword [ebp-0x08], 0x00000010 | |
| EB01 | jmp | 0x005E4FBD | +021 |
| A8C7 | test | al, 0xC7 | |
| C745FC05000000 | mov | dword [ebp-0x04], 0x00000005 | |
| 05000000EB | add | eax, 0xEB000000 | |
| 02EB | add | ch, bl | |
| 01EB | add | ebx, ebp | |
| 01EB | add | ebx, ebp | |
| C745D801000000 | mov | dword [ebp-0x28], 0x00000001 | |
| C645F001 | mov | byte [ebp-0x10], 0x01 | |
| E803 | jmp | 0x005E4FDB | +024 |
| CD20 | int | 0x20 | |
| 17 | pop | ss | |
| C745E400000000 | mov | dword [ebp-0x1C], 0x00000000 | |
| EB02 | jmp | 0x005E4FE6 | +025 |
| A8BF | test | al, 0xBF | |
| EB19 | jmp | 0x005E5001 | +029 |
| 8B45E4 | mov | eax, dword [ebp-0x1C] | |
| EB01 | jmp | 0x005E4FEE | +026 |
| EBEB | jmp | 0x005E4FDA | -023 |
| EB02 | jmp | 0x005E4FF2 | +027 |
| CD20 | int | 0x20 | |
| 83C001 | add | eax, 0x01 | |
| EB03 | jmp | 0x005E4FFA | +028 |
| CD20 | int | 0x20 | |
| 698945E4EB02FF15817D | imul | ecx, dword [ecx+0x02EBE445], 0x7D8115FF | |
| 8945E4 | mov | dword [ebp-0x1C], eax | |

FIG. 10

```
892510365E00            mov       dword [0x005E3610], esp
684F4F5E00              push      0x005E4F4F
64FF3500000000          push      dword fs:[0x00000000]
64892500000000          mov       dword fs:[0x00000000], esp
55                      push      ebp
8BEC                    mov       ebp, esp
83EC64                  sub       esp, 0x64
C745F810000000          mov       dword [ebp-0x08], 0x00000010
C745FC05000000          mov       dword [ebp-0x04], 0x00000005
C745D801000000          mov       dword [ebp-0x28], 0x00000001
C645F001                mov       byte [ebp-0x10], 0x01
C745E400000000          mov       dword [ebp-0x1C], 0x00000000
```

NORMALIZING ENTRY POINT INSTRUCTIONS IN EXECUTABLE PROGRAM FILES

CROSS-REFERENCE TO RELATED APPLICATIONS

This Application claims priority to U.S. Provisional Patent Application Ser. No. 62/526,994, filed on Jun. 29, 2017, entitled "Normalizing Entry Point Instructions in Executable Program Files," the entire disclosure of which is incorporated herein by reference.

FIELD

The disclosure relates generally to computing systems, and more particularly, to normalizing entry point instructions in executable program files of computing systems.

BACKGROUND

Malware, short for "malicious software," is software that can be used to disrupt computer operations, damage data, gather sensitive information, or gain access to private computer systems without the user's knowledge or consent. Examples of such malware include software viruses, Trojan horses, rootkits, ransomware etc. Correctly identifying which files contain malware and which are benign can be a difficult task, because malware developers often obfuscate the code. For example, malware authors may employ obfuscators that add "garbage" instructions, which do nothing, but make the analysis of executable files harder. The garbage instructions are randomly chosen and can be inserted at random points. Thus, any two members of one malware family can appear to be totally different, even though they have identical functionality.

SUMMARY OF THE INVENTION

The object of the invention is to normalize entry point instructions to include receiving a scope of instructions starting at an entry point of executable code. For each instruction in the scope of instructions, a determination is made if the instruction performs an ineffective operation or if the instruction, in combination with another instruction, renders either or both instructions ineffective. Ineffective instructions are filtered such that they do not appear in an output buffer.

BRIEF DESCRIPTION OF THE DRAWINGS

For a better understanding of the inventive subject matter, reference may be made to the accompanying drawings in which:

FIG. 5 illustrates an example block of raw code at entry points of a family of executable files prior to normalization.

FIG. 6 illustrates the example block of raw code after arguments have been removed.

FIG. 7 illustrates the example block of raw code after unconditional jumps and code skipped due to the unconditional jump have been removed.

FIG. 8 illustrates the example block of raw code where instruction arguments have been shrunk to one byte.

FIG. 9 illustrates the example block of raw code after duplicates have been removed.

FIG. 10 illustrates a code listing of raw code at an entry point of an executable file that includes garbage code prior to normalization.

FIG. 11 illustrates the example block of raw code after normalization.

DETAILED DESCRIPTION

Figure 1:
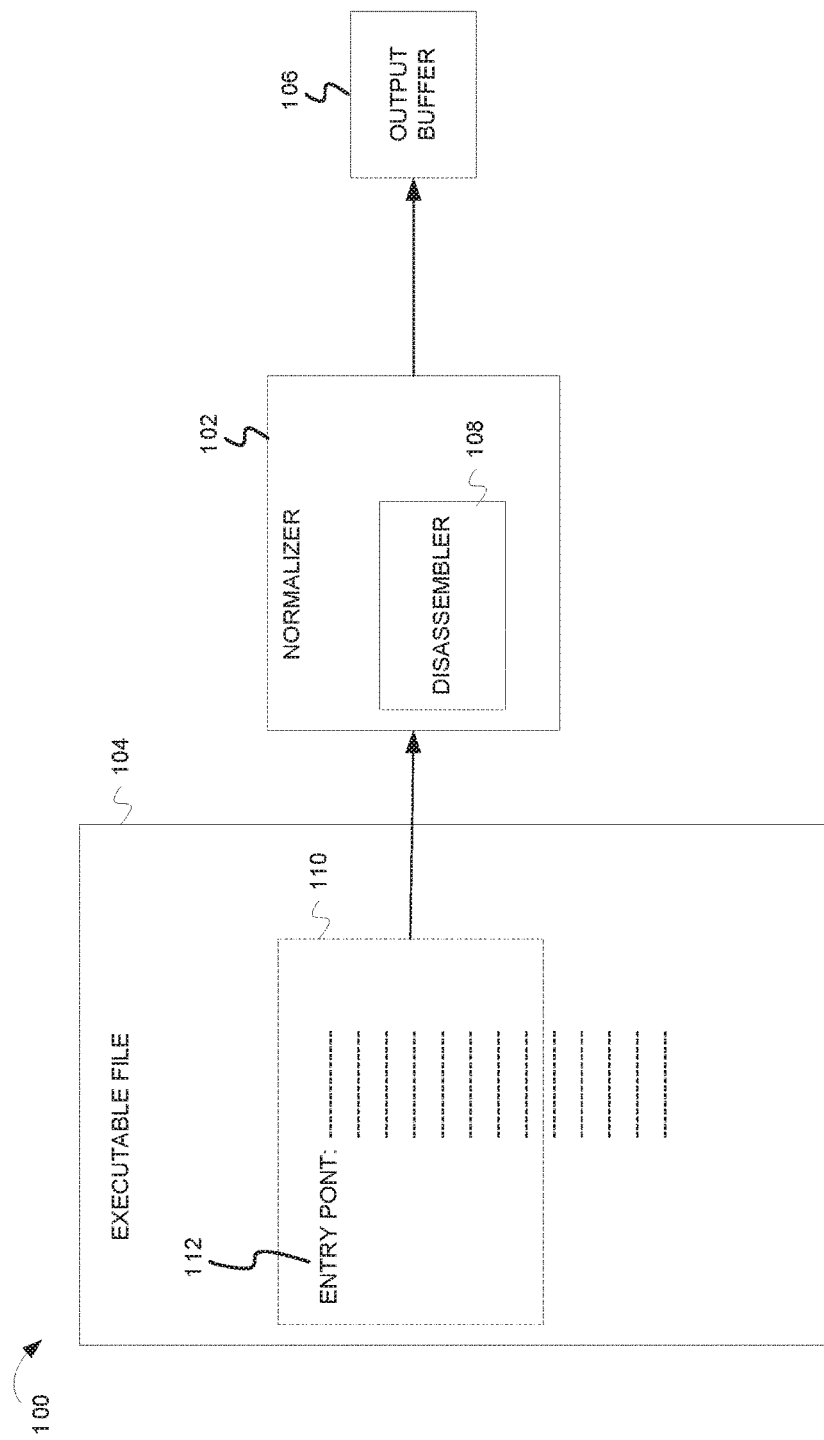
FIG. 1 is a block diagram of a system for normalizing entry point instructions in executable files.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram of a system 100 for normalizing entry point instructions in executable files. In some embodiments, system 100 includes a normalizer 102 that reads an executable file 104 to produce a normalized output buffer 106.

In some aspects, the executable file 104 can be a Portable Executable (PE) file that is commonly used on various versions of the Microsoft Windows family of operating systems. However, the inventive subject matter is not limited to PE files, and in alternative aspects, the executable file 104 can be an Executable and Linkable Format (ELF) file commonly used in Linux or UNIX based systems, or a Mach-O file commonly used in MAC OS X operating systems. The embodiments are not limited to a particular type of executable file. In some aspects, executable file 104 has a header section, at least one code section (sometimes referred to as a text section) and at least one data section. The executable file 104 includes an entry point 112. The address of the entry point may be specified in a header section of the executable file. The entry point 112 is the starting address of the executable code in the executable file 104. For example, an operating system can load the executable file 104 into memory in response to a request to run an application or other program contained in the executable file. The operating system causes the application or program to begin to execute the code starting at the entry point 112.

Normalizer 102 can read the executable program code in executable file 104. In some embodiments, normalizer 102 reads a portion of the executable file within a scope 110 of the entry point 112. In some embodiments, scope 110 can be 4096 bytes starting at the entry point 112. While 4096 bytes provides for efficiency because it corresponds to typical memory block sizes on storage devices, those of skill in the art having the benefit of the disclosure will appreciate that other sizes for scope 110 can be used and are within the inventive subject matter. Normalizer 102 can include a disassembler 108 that parses the instructions (i.e., source instructions) within the scope 110 into component parts. In embodiments that process PE files, such component parts can include various combinations of one or more of the prefix, operation code, the ModRM byte, the SIB byte, the immediate and the displacement. The instruction may be 1 to 15 bytes long depending on the type of instruction and which component parts are present in the instruction. Normalizer 102 can process the disassembled instructions to produce output buffer 106 by removing (i.e., filtering out) selected portions of the disassembled instructions that comprise ineffective instructions (i.e., garbage instructions) or instruction components that are unimportant to determining whether the executable file contains malware. In some embodiments, the output buffer is 64 bytes. The inventor has found that a size of 64 bytes is typically sufficient to distinguish between families of malware. However, those of skill in the art having the benefit of the disclosure will appreciate that other sizes for the output buffer, for example, 96 bytes, could be used and are within the scope of the inventive subject matter.

Further details on the operation of normalizer 102 are provided below with respect to FIGS. 2-9.

Figure 2:
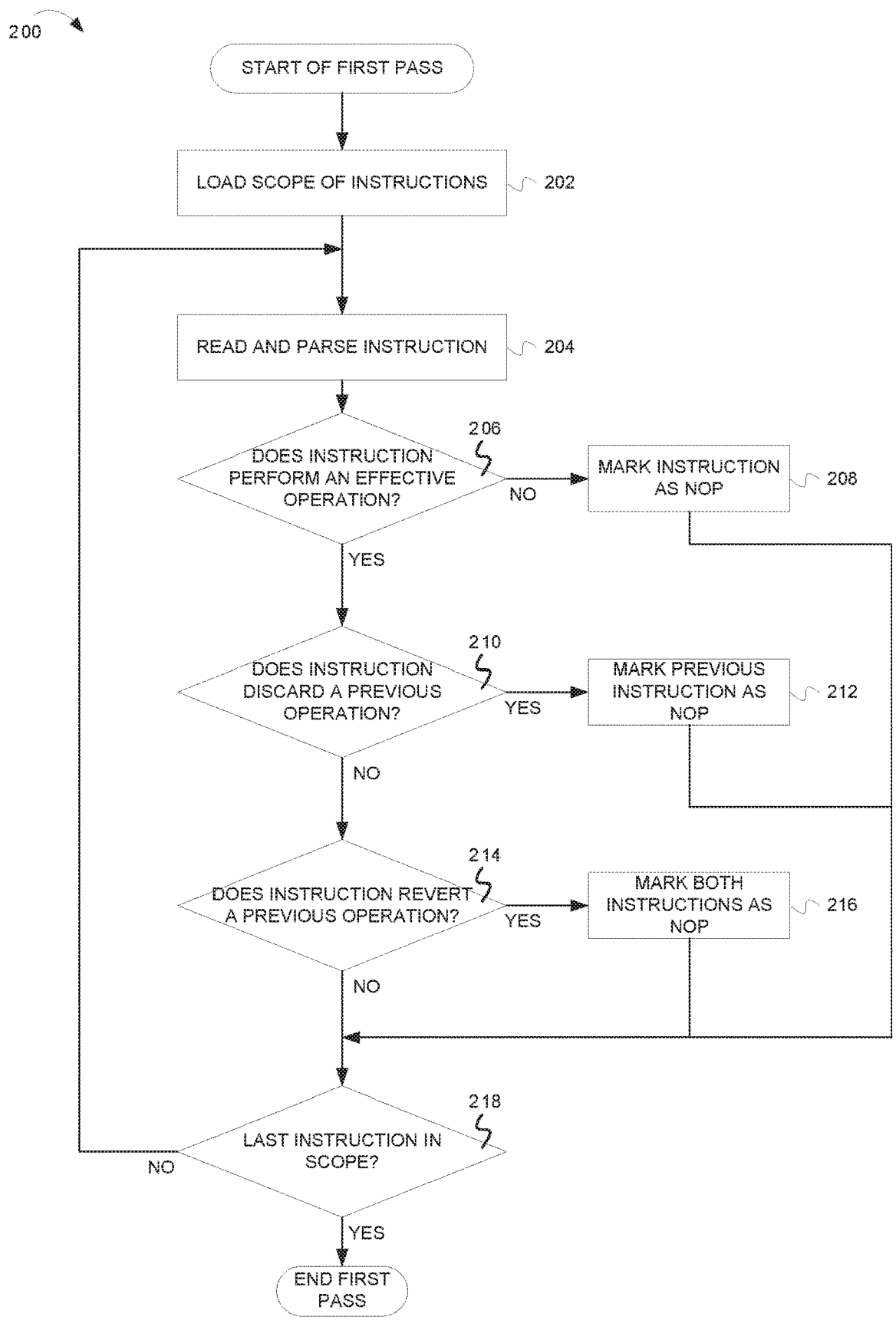
FIG. 2 is a flow chart illustrating operations of a method for normalizing entry point instructions in executable files.
Figure 3:
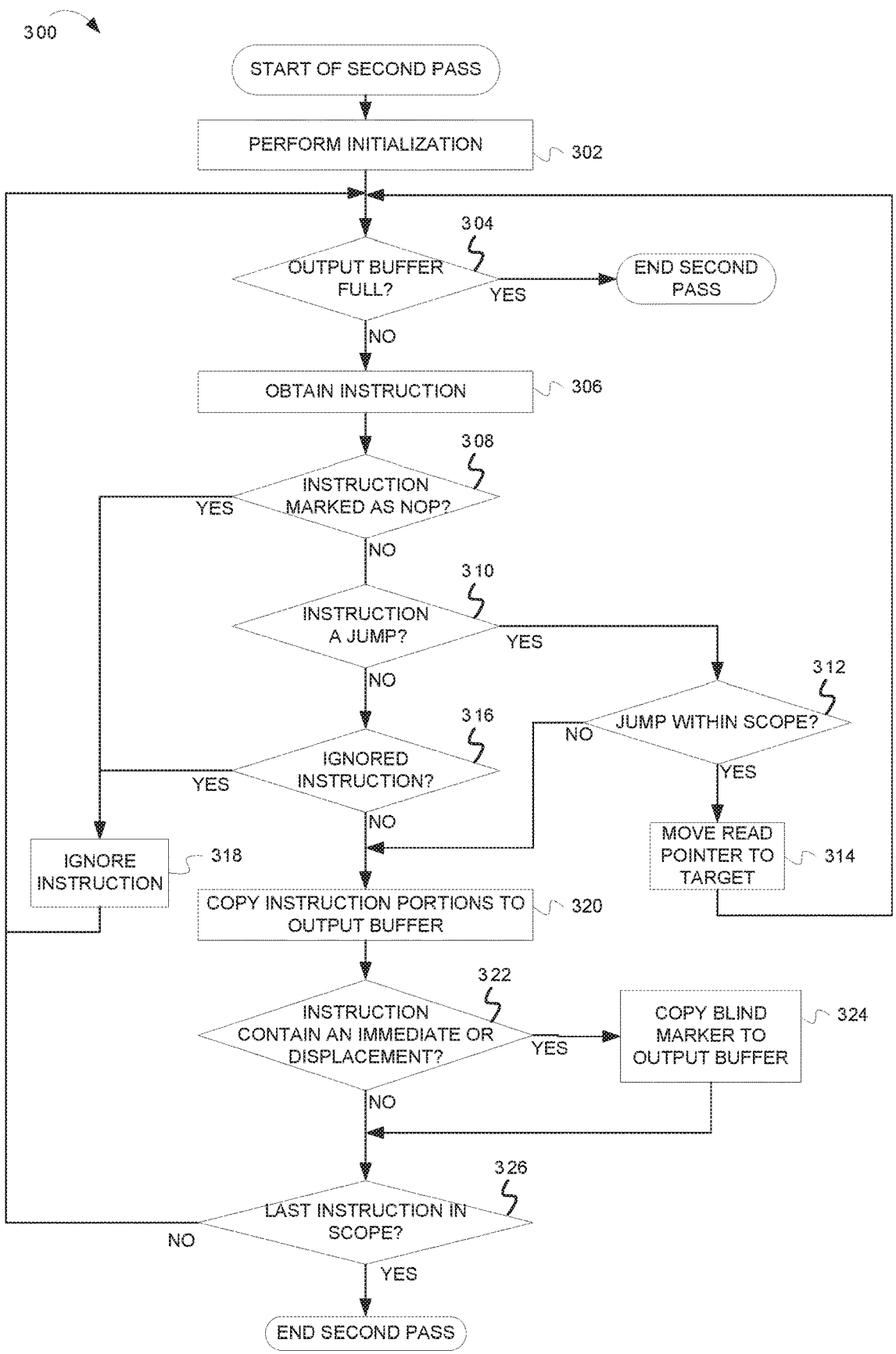
FIG. 3 is a flow chart illustrating further details of operations of a method for normalizing entry point instructions in executable files.

FIGS. 2 and 3 are flow charts illustrating operations of methods for normalizing entry point instructions in executable files. The methods illustrated in FIGS. 2 and 3 represent a first pass and a second pass respectively through a scope of instructions as performed by some embodiments. The methods may, in some aspects, constitute computer programs made up of computer-executable instructions. Describing the methods by reference to a flow chart enables one skilled in the art to develop such programs including such instructions to carry out the method on suitable processors (the processor or processors of the computer executing the instructions from computer-readable media). The methods illustrated in FIGS. 2 and 3 are inclusive of acts that may be taken by a normalizer 102 or other program executing an example embodiment of the invention.

FIG. 2 is a flow chart 200 illustrating operations of a method for determining if instructions perform an effective operation.

At block 202, the instructions within the scope of instructions are loaded for processing. In some embodiments, a scope of 4096 bytes starting at the entry point is loaded.

At block 204, an instruction from the scope is read and parsed (e.g., disassembled).

At block 206, a check is made to determine if the instruction read and parsed at block 204 performs an effective operation. As an example, an effective operation is one that causes a change in a register, flag, stack and/or memory location. Instructions that behave like a NOP (no operation) are determined by the normalizer to not perform an effective operation. One example of an instruction in the Intel x86 instruction set architecture that does not perform an effective operation is the XCHG ECX, ECX, which is a swap between the same register. Those of skill in the art having the benefit of the disclosure will appreciate that other instructions can behave like a NOP in the x86 architecture and other processor architectures.

If the instruction does not perform an effective operation, then at block 208, the instruction is marked as a NOP (i.e., the instruction is indicated to be a "garbage" or ineffective instruction). Flow proceeds to block 218 from block 208.

If the check at block 206 determines that the instruction does perform an effective operation, then flow proceeds to block 210.

At block 210, a check is made to determine if the instructions discards a previous operation. A previous operation is considered to be discarded if the current instruction makes a previous operation useless. As an example, assume that a first operation assigns a value of 123 to some register or memory cell and, by a subsequent operation, the same memory cell or register is set to a different value, e.g. 234 prior to its use by another operation. In this case, the first operation has been discarded (i.e., made useless). The previous operation may be immediately previous to the current operation, or it may be separated by intervening instruction(s) between the previous operation and the current operation. If the instruction discards a previous operation, then flow proceeds to block 212, where the previous instruction (i.e., the instruction whose operation was discarded) is marked as a NOP. Flow proceeds to block 218 from block 212.

If the check at block 210 determines that the instruction does not discard a previous operation, then flow proceeds to block 214.

At block 214, a check is made to determine if the instruction reverts a previous instruction. In other words, a check is made to determine whether the current instruction, in combination with a previous instruction or set of instructions, does nothing effective. For example, in the x86 architecture, a NEG EAX instruction followed by a second NEG EAX is a negation that is called twice on the same register. The second NEG instruction reverts the first NEG instruction. Similarly, an INC EAX followed by a DEC EAX results in the EAX register having the same value as before the combination of instructions were executed, and thus does nothing (i.e., behaves like a NOP). The previous operation may be immediately previous to the current operation, or it may be separated by intervening instruction(s) between the previous operation and the current operation. Thus, block 214 checks for instructions that in combination do nothing, i.e., the instructions, in combination, result in the same state of registers, flags, stack and memory as before their execution.

If the check at block 214 determines that the instructions reverts a previous instruction, then flow proceeds to block 216, where both the current instruction and the previous instruction are marked as a NOP.

If the check at block 214 determines that the current instruction does not revert a previous instruction, then flow proceeds to block 218.

At block 218, a check is made to determine if the last instruction in the scope of instructions has been analyzed. If not, the method returns to block 204 to read and parse the next instruction in the scope of instructions. Otherwise, the method ends.

FIG. 3 is a flow chart 300 illustrating further details of operations of a method for normalizing entry point instructions in executable files. In some embodiments, the operations are performed as a second pass after the method illustrated in FIG. 2.

At block 302, initialization operations are performed. For example, a read pointer can be set to the first instruction in the instruction scope 110. The read pointer can contain an address in the input scope of the current instruction being processed. An output buffer can be allocated if necessary. In some embodiments, the output buffer is 64 bytes in length.

Blocks 304-326 form a loop that processes the code in the instruction scope 110. At block 304, a check is made to determine if the output buffer is full. If the output buffer is full, then the method terminates.

Otherwise, the output buffer has room to hold at least a portion of one more normalized instruction and the method proceeds to block 306.

At block 306, an instruction at the current read pointer is obtained from the instruction scope 110.

At block 308, a check is made to determine if the instruction is marked as a NOP (i.e., the instruction was indicated to not be effective during the execution of the method of FIG. 2). If the instruction is marked as a NOP, then flow proceeds to block 318, where the instruction is ignored. For example, the instruction is not placed into the output buffer and the read pointer for the scope of instructions can be advanced to the next instruction. Flow then returns to block 304.

If the check at block 308 determines that the instruction was not marked as a NOP, flow proceeds from block 308 to block 310, where a check is made to determine if the instruction is a jump instruction. If the instruction is a jump instruction, then at block 312 a check is made to determine if the target of the jump is within the instruction scope. If the target is within the instruction scope, then at block 314 the read pointer for the instruction scope is advanced to the target location of the jump. The method then returns to block 304. This results in the jump instruction and the code between the jump instruction and the target location being ignored, i.e., not placed in the output buffer. Otherwise, if the target location is not within the instruction scope, flow proceeds to block 320.

If the check at block 310 determines that the instruction is not a jump instruction, then flow proceeds to block 316. At block 316, a check can be optionally performed to determine if the instruction belongs to a category of instructions that are designated to be ignored. For example, it may be desirable to ignore instructions that perform stack operations and/or comparison instructions. Ignoring such instructions can be desirable in order to create a consistent set of normalized instructions that can be compared with normalized instructions associated with other executable files. If the instruction belongs to a category of ignored instructions, then flow proceeds to block 318, which, as described above, can cause the instruction to be ignored by advancing the read pointer past the current instruction and returning to block 304. If the instruction does not belong to a category of ignored instructions, the flow proceeds to block 320.

Block 320 is reached if the instruction is not marked as a NOP, is not a jump outside of the instruction scope, and does not belong to an ignored category of instructions. In this case, the instruction likely performs an effective operation. At block 320, portions of the instruction are copied to the output buffer. In some embodiments, any instruction prefixes, the opcode the ModRM byte, and the SIB byte are copied to the output buffer. Other portions of the instruction are not copied into the output buffer in some embodiments.

At block 322, a check is made to determine if the instruction contains an immediate or displacement portion. If the instruction does not contain an immediate or displacement, flow proceeds to block 326. If the instruction contains an immediate or displacement, then flow proceeds to block 324 where a blind marker is copied to the output buffer. This has the effect of replacing the immediate or displacement with the blind marker. In some embodiments, a single blind marker is used for an instruction even if the instruction has more than one immediate and/or displacement. A blind marker is useful when the result is supposed to be read by some human operator. The blind marker splits a flow of instructions and indicates that in the place where the blind marker is inserted was some unimportant data, which has been omitted. In some embodiments a double dash ("-", as can be seen on FIGS. 5-9) is used and can be visually distinguished from hexadecimal sequence of prefixes, opcodes, ModRM bytes and SIB bytes. In alternative embodiments, other sequences of one or more characters (e.g., question mark, asterisk etc.) can be used for the blind marker. After the blind marker is inserted into the output buffer, flow then proceeds to block 326.

At block 326, a check is made to determine if the current instruction was the last instruction in the instruction scope. If so, the method ends. If not, the read position is updated to the next instruction, and flow returns to block 304 to process the next instruction.

Those of skill in the art having the benefit of the disclosure will appreciate that the order of operations performed in the methods described in FIGS. 2 and 3 can be performed in a different order than that described above. For example, the checks at decision blocks 206, 210 and 214 of FIG. 2, along with their associated operations, could be performed in a different order than that shown. Similarly, the checks at blocks 308, 310 and 316 of FIG. 3, along with their associated operations, could be performed in a different order. Additionally, some or all of the operations of the methods in FIGS. 2 and 3 could be combined into a single method.

After execution of the operations of the methods of FIGS. 2 and 3, the instructions in the output buffer are effective instructions from the instruction scope. Ineffective instructions can be filtered out by the methods illustrated in FIGS. 2 and 3 and thus are not copied to the output buffer. In some embodiments, the instructions in the output buffer represent instructions from the executable file that are always executed, without any possible detour. It is not necessary that the instructions in the output buffer include all of the original functionality. Instead, it is sufficient that the instructions provide a code skeleton, which will typically always be present in each family member of a virus or other malware, and which has always the same "shape." A shape is a visual pattern of the normalized code (prefixes, opcodes, ModRM bytes, SIB bytes and blind markers) that looks the same or very similar for all members of a family of malware. The "shape" or pattern allows an analyst to visually determine if a pattern or shape of sample code under consideration likely matches a family of malware.

The instructions in the output buffer can be used as all or part of a file fingerprint, similarity vector, or other file comparison data structure that can be used by malware detection software. For example, the output buffer, fingerprint, similarity vector or other file comparison data structure can be compared with a second output buffer, fingerprint, similarity vector or other file comparison data structure associated with known malware or known clean executables. If the comparison indicates sufficient similarity (i.e., similarity above a predetermined or configurable threshold) then the output buffer associated with the executable code under consideration can be indicated to be infected with the known malware or clean.

Figure 4:
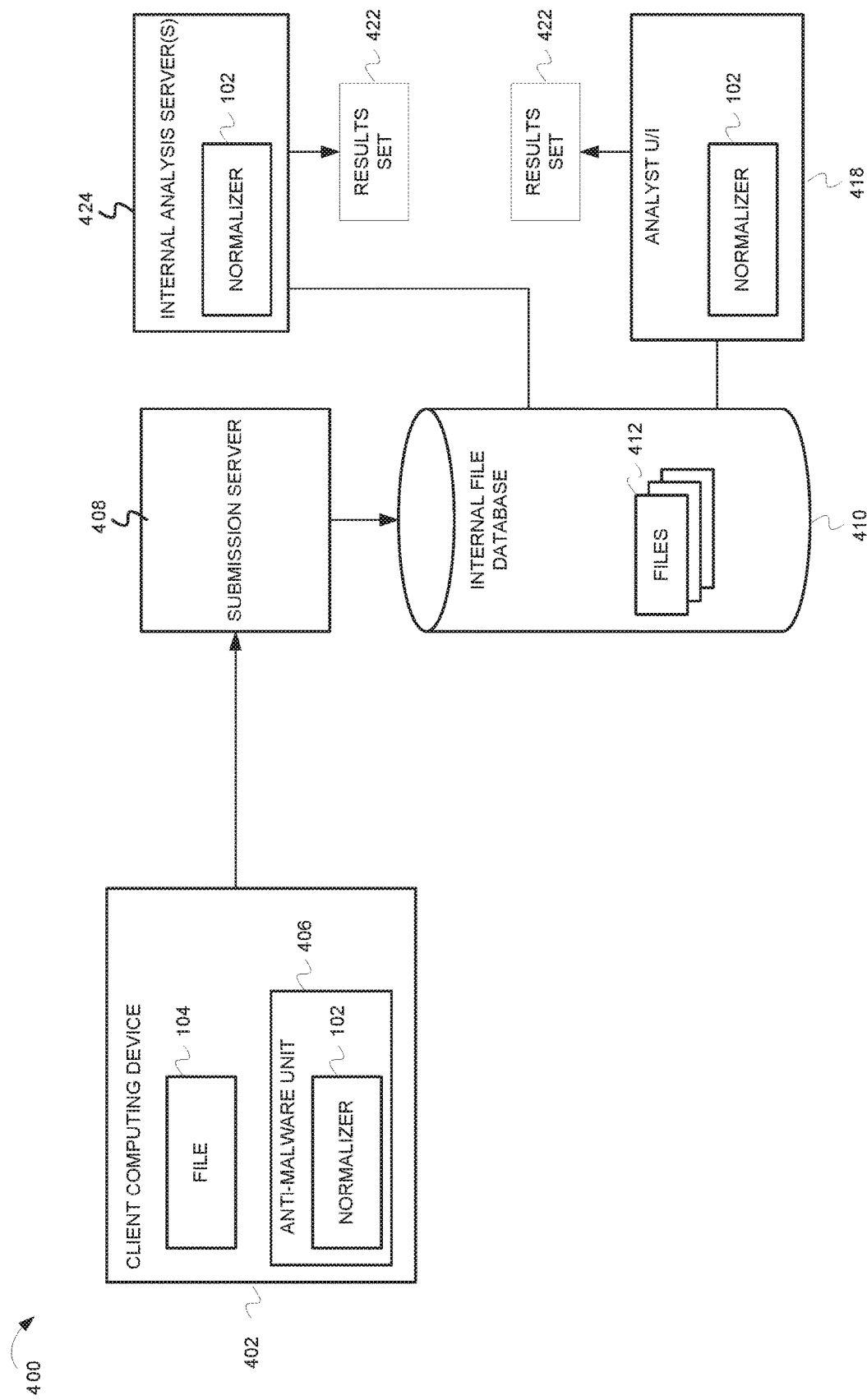
FIG. 4 is a block diagram illustrating an example system utilizing normalized entry point instructions.

FIG. 4 is a block diagram illustrating an example system 400 utilizing normalized entry point instructions. In some embodiments, system 400 includes client computing device 402, submission server 408, internal file database 410, main application server 416, internal analysis server 424, and an analyst user interface (U/I) 418.

Client computing device 402 can be a desktop computer, laptop computer, server computer, tablet computer, smart phone, personal digital assistant, media player, set top box, game console, IoT (Internet of Things) device or any other device having one or more processors and memory for executing computer programs. The embodiments are not limited to any particular type of computing device. Client computing device 402 can include an anti-malware unit 406. Anti-malware unit 406 can include one or more of software, firmware or other programmable logic that can detect malicious files. Additionally, anti-malware unit 406 can submit a new file 404 for analysis. The new file may be a file that has not been seen before by the anti-malware unit 406, or may have only been seen on a low number of systems (e.g., the file may be a day one malware source). Anti-malware unit 406 can include a normalizer 102 that generates a normalized instruction output buffer as described above in FIGS. 2 and 3. The resulting output buffer can be compared to stored output buffers associated with known malware to determine if the file 404 contains malware, or is suspected of containing malware. In response to determining that the file contains malware, the anti-malware unit can alert the user, quarantine the file 404, and/or remove the mal-ware from the file 404.

In response to determining that the file 404 is suspected of containing malware, client computing device 402 can submit file 404 to submission server 408. Submission server 408 can perform preprocessing on the new file 404 and add the new file to a collection of files 412.

Analyst U/I 418 can provide a user interface for an analyst to access tools that can be used to determine if a file contains malware. The analyst U/I 418 may include a normalizer 102 that can be used to generate an output buffer as described above that can be associated with a file under analysis. The generated output buffer can be compared to output buffers associated with files known to contain malware, or known clean files to aid in determining if a file contains malware. Further, in some aspects, the analyst U/I can receive an unknown file (i.e., a PE file that has not been analyzed yet). The analyst U/I can use a normalizer 102 for the unknown file to generate an output buffer as described above. Then, the analyst U/I can compare the output buffer of generated from the unknown file with output buffers associated with files 412 in the internal file database 410.

Internal analysis servers 424 can perform static or dynamic analysis of a file for internal database 410. In some aspects, an internal analysis application can perform a static analysis of a file. Internal analysis server 424 can include normalizer 102 that can be used to generate an output buffer as described above that can be associated with a file under analysis. The generated output buffer can be compared to output buffers associated with known malware, or known clean files to aid in determining if a file contains malware. For example, if the generated output buffer is sufficiently similar to a previously determined output buffer associated with known malware, then the file associated with the generated output buffer can be considered to include malware. The generated output buffer can be considered to be sufficiently similar to another output buffer if the two buffers match either exactly or the confidence of a match is determined to be at or above a predetermined or configurable threshold.

Further, the output buffer generated for the file can be stored along with the file in internal file database 410. For example, the output buffer generated for the file can be stored as a fingerprint for the file.

Some embodiments can provide a more efficient way to analyze an executable file for indications of malware. For example, it is not necessary for the code to be run in order to determine which instructions are effective. Instead, the executable file can be statically analyzed without the need for runtime analysis. Such static analysis can be more efficient and convenient than runtime analysis. Additionally, the methods described above can be used to identify files that contain malware. Preventing such malware from executing on a computing system can result in more efficient and safer operation of the computing system.

Figure 5:
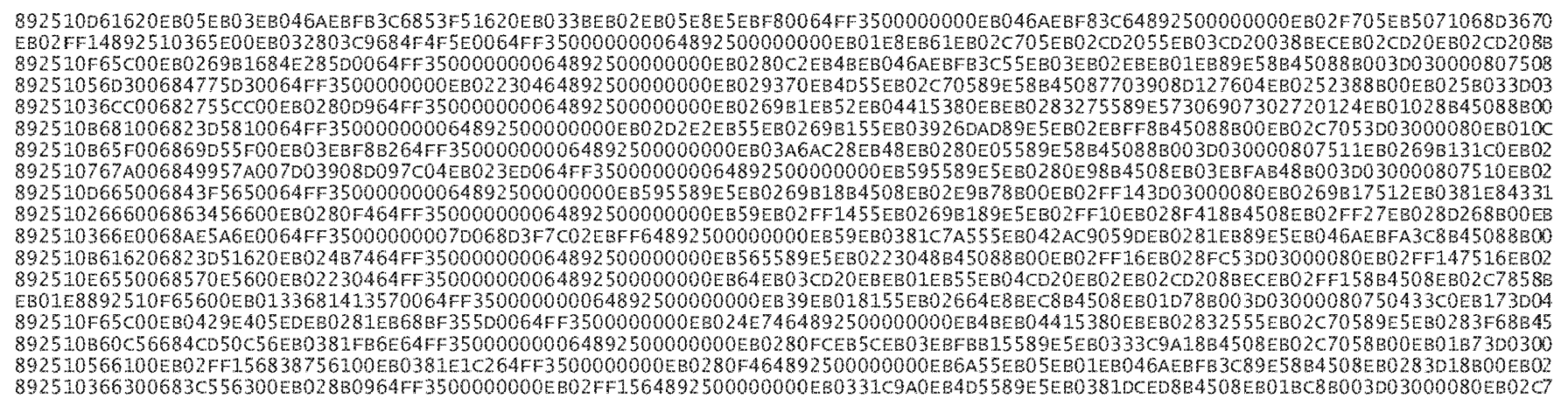

FIG. 5 illustrates an example block of raw code at entry points of a family of executable files prior to normalization. The example block of raw code comprises the raw code for one obfuscated family of executable files having the same malware. Each row in the code dump represents an individual executable file in the family that may have been obfuscated in various ways. While some similarities exist, the difference between family members (i.e., rows) is relatively high.

FIG. 6 illustrates the example block of raw code after instruction arguments (immediates and displacements) have been removed and replaced with dashes. Again, while similarities exist between the rows representing family members, significant differences remain.

Figure 7:
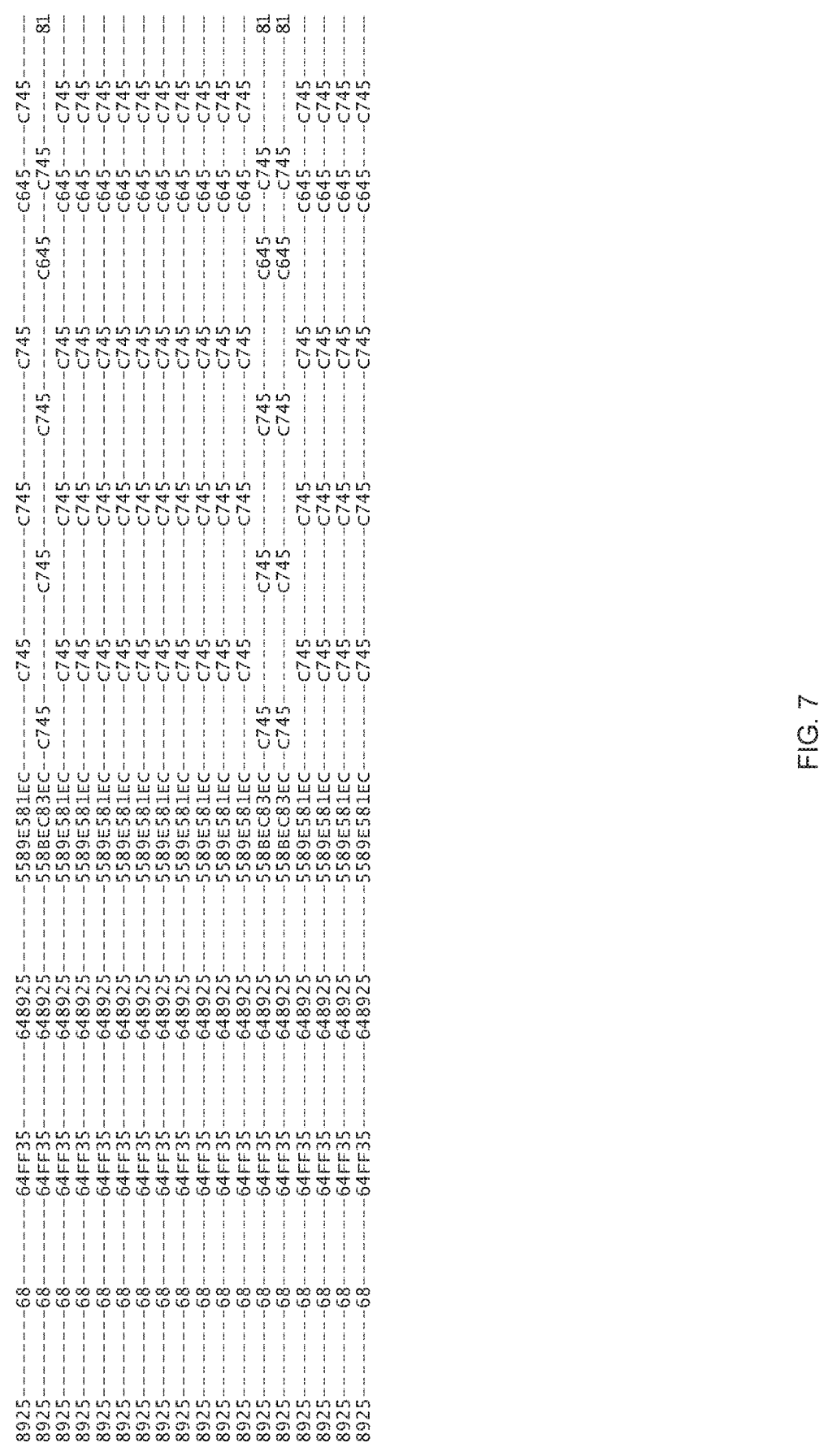

FIG. 7 illustrates the example block of raw code after unconditional jumps and code skipped due to the unconditional jump have been removed. Here, the similarity between the rows representing family members becomes more apparent.

Figure 8:
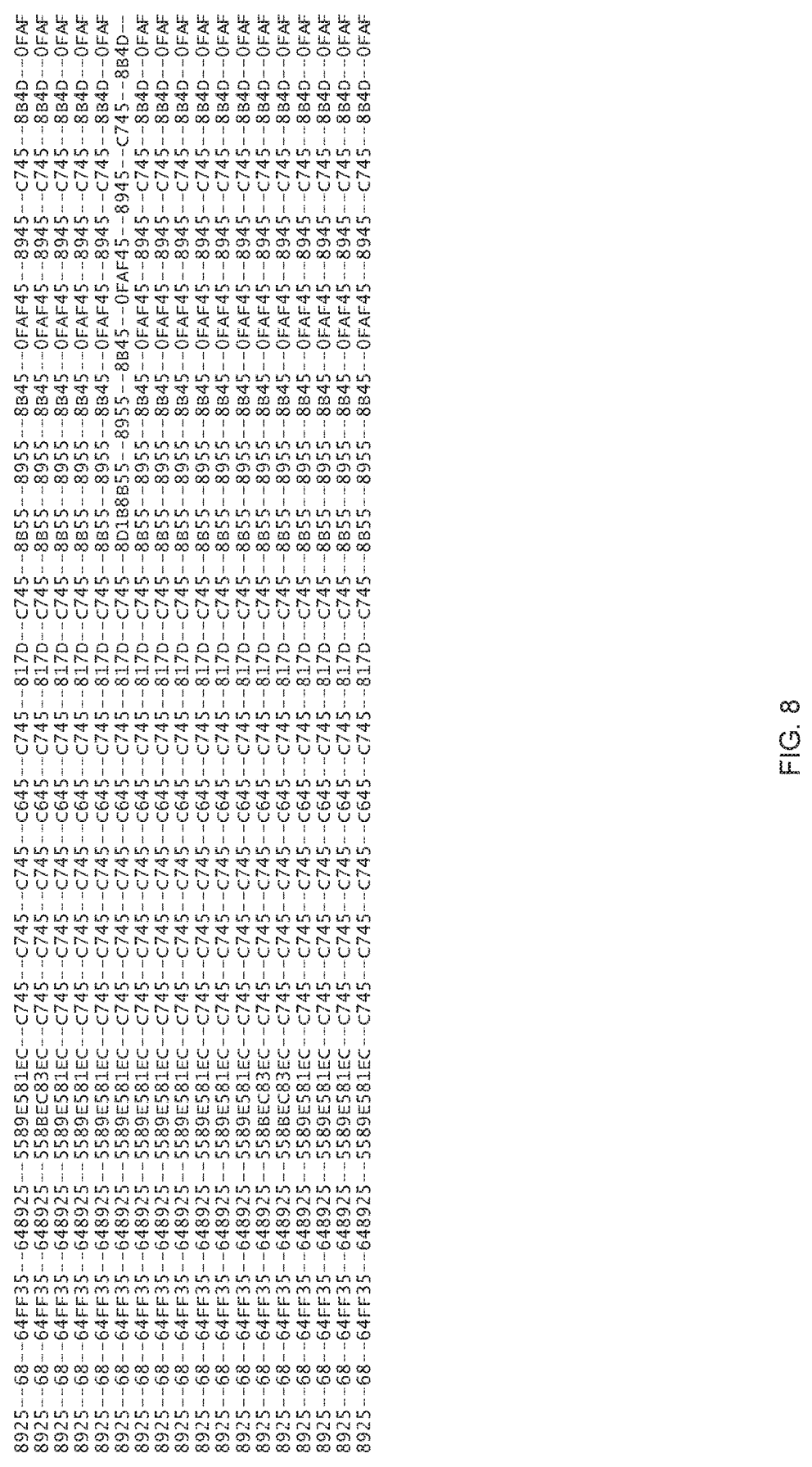

FIG. 8 illustrates the example block of raw code where instruction arguments have been replaced by a single byte blind marker (represented by a double dash in FIG. 8). The similarities between the rows representing family members become even more apparent.

FIG. 9 illustrates the example block of raw code after duplicate rows have been removed. Three similar sequences remain after removing duplicates. This can be contrasted to the 18 very different sequences for the family of executables presented in FIG. 5.

FIG. 10 illustrates a code listing of raw code at an entry point of an executable file that includes ineffective code prior to normalization. The code listing provided in FIG. 10 is associated with the third sample (i.e., row) of FIG. 9. Ineffective instructions have been italicized in the example code listing of FIG. 10.

FIG. 11 illustrates the example block of raw code shown in FIG. 10 after normalization to remove ineffective code.

Figure 12:
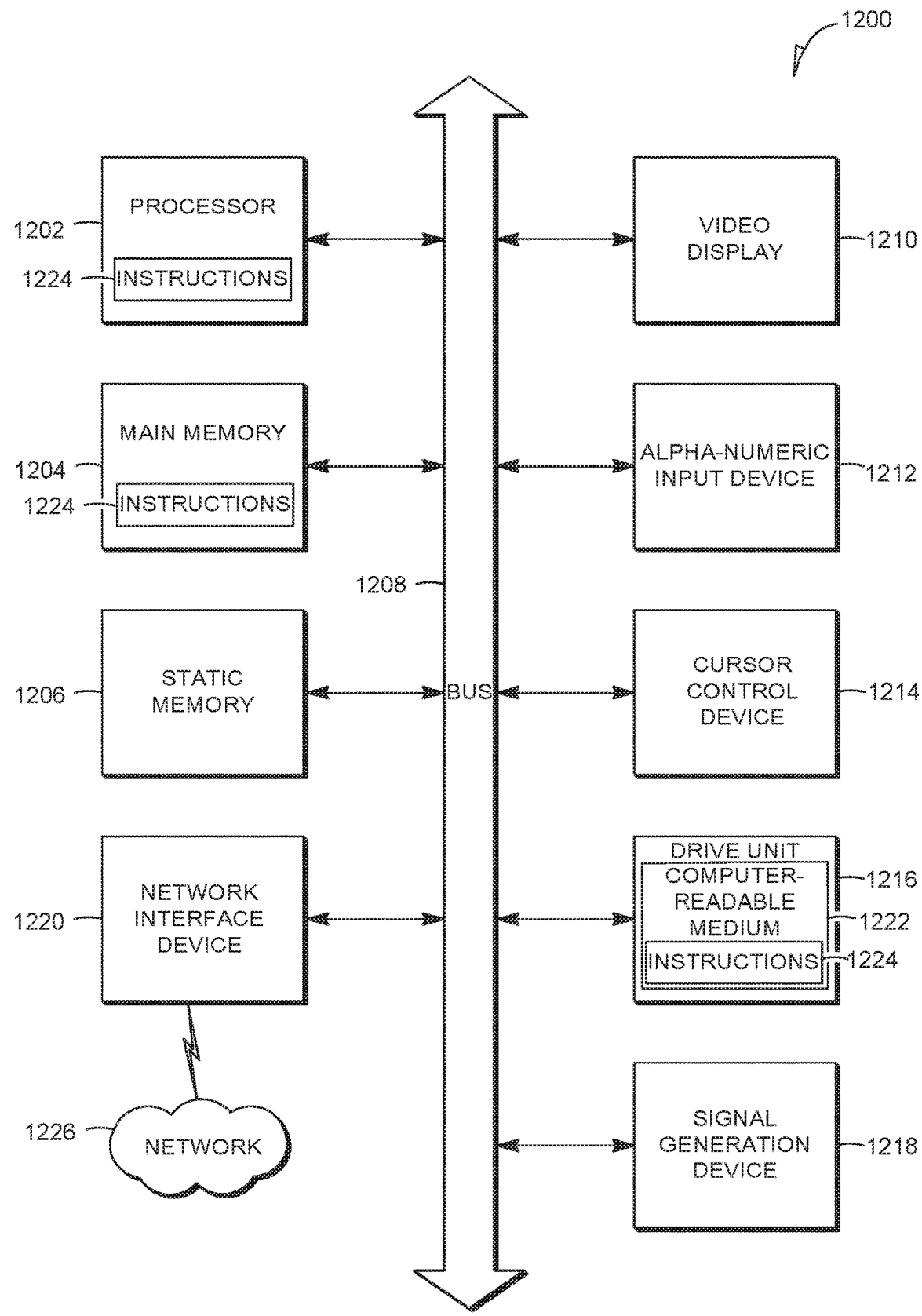
FIG. 12 is a block diagram of an example embodiment of a computer system upon which embodiments of the inventive subject matter can execute.

FIG. 12 is a block diagram of an example embodiment of a computer system 1200 upon which embodiments of the inventive subject matter can execute. The description of FIG. 12 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 12 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 12, an example embodiment extends to a machine in the example form of a computer system 1200 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 1200 may include a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). In example embodiments, the computer system 1200 also includes one or more of an alpha-numeric input device 1212 (e.g., a keyboard), a user interface (UI) navigation device or cursor control device 1214 (e.g., a mouse), a disk drive unit 1216, a signal generation device 1218 (e.g., a speaker), and a network interface device 1220.

The disk drive unit 1216 includes a machine-readable medium 1222 on which is stored one or more sets of instructions 1224 and data structures (e.g., software instructions) embodying or used by any one or more of the methodologies or functions described herein. The instructions 1224 may also reside, completely or at least partially, within the main memory 1204 or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 1224 may further be transmitted or received over a communications network 1226 using a signal transmission medium via the network interface device 1220 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for normalizing entry point instructions, the method comprising:
    receiving a plurality of instructions including an entry point of executable code;
    for each instruction in the plurality of instructions:
        parsing the instruction,
        determining whether the instruction performs an effective operation, and
        in response to determining that the instruction does not perform an effective operation, marking the instruction as ineffective; and
    filtering one or more instructions of the plurality of instructions marked as ineffective such that the one or more instructions are not copied to an output buffer.

2. The method of claim 1, further comprising:
    determining whether the instruction discards an operation of a previous instruction; and
    in response to determining that the instruction discards the operation of the previous instruction, marking the previous instruction as ineffective.

3. The method of claim 1, further comprising:
    determining whether the instruction reverts an operation of a previous instruction; and
    in response to determining that the instruction reverts the operation of the previous instruction, marking the instruction and the previous instruction as ineffective.

4. The method of claim 1, further comprising:
    determining whether the instruction comprises a jump instruction having a target address within the plurality of instructions; and
    in response to determining that the instruction comprises the jump instruction having the target address within the plurality of instructions, filtering the jump instruction and instructions between the jump instruction and the target address such that the jump instruction and instructions between the jump instruction and the target address are not copied to the output buffer.

5. The method of claim 1, further comprising:
    determining whether the instruction has a type associated with an ignored instruction; and
    in response to determining that the instruction has the type associated with an ignored instruction, filtering the instruction such that the instruction is not copied to the output buffer.

6. The method of claim 1, further comprising:
    determining whether the instruction contains an immediate or displacement; and
    in response to determining that the instruction contains the immediate or displacement, replacing the immediate or displacement with a blind marker in the output buffer.

7. The method of claim 1, further comprising:
    comparing the output buffer with a second output buffer associated with an executable containing known malware; and
    indicating that the executable code contains the known malware in response to determining that the output buffer and the second output buffer are sufficiently similar.

8. A non-transitory machine-readable storage medium having stored thereon computer-executable instructions for normalizing entry point instructions, the computer-executable instructions to cause one or more processors to perform operations comprising:
    receive a plurality of source instructions including an entry point of executable code;
    for each source instruction in the plurality of source instructions:
        parse the source instruction,
        determine whether the source instruction performs an effective operation, and
        in response to a determination that the source instruction does not perform an effective operation, mark the source instruction as ineffective; and
    filter one or more source instructions of the plurality of source instructions marked as ineffective such that the one or more source instructions are not copied to an output buffer.

9. The non-transitory machine-readable storage medium of claim 8, wherein the operations further comprise:
    determine whether the source instruction discards an operation of a previous source instruction; and
    in response to a determination that the source instruction discards the operation of the previous source instruction, mark the previous source instruction as ineffective.

10. The non-transitory machine-readable storage medium of claim 8, wherein the operations further comprise:
    determine whether the source instruction reverts an operation of a previous source instruction; and
    in response to a determination that the source instruction reverts the operation of the previous source instruction, mark the source instruction and the previous source instruction as ineffective.

11. The non-transitory machine-readable storage medium of claim 8, wherein the operations further comprise:
    determine whether the source instruction comprises a jump instruction having a target address within the plurality of source instructions; and
    in response to a determination that the source instruction comprises the jump instruction having the target address within the plurality of source instructions, filter the jump instruction and source instructions between the jump instruction and the target address such that the jump instruction and source instructions between the jump instruction and the target address are not copied to the output buffer.

12. The non-transitory machine-readable storage medium of claim 8, wherein the operations further comprise:
   determine whether the source instruction has a type associated with an ignored instruction; and
   in response to a determination that the source instruction has the type associated with an ignored instruction, filter the source instruction such that the source instruction is not copied to the output buffer.

13. The non-transitory machine-readable storage medium of claim 8, wherein the operations further comprise:
   determine whether the source instruction contains an immediate or displacement; and
   in response to a determination that the source instruction contains the immediate or displacement, replace the immediate or displacement with a blind marker in the output buffer.

14. The non-transitory machine-readable storage medium of claim 8, wherein the operations further comprise:
   compare the output buffer with a second output buffer associated with an executable containing known malware; and
   indicate that the executable code contains the known malware in response to a determination that the output buffer and the second output buffer are sufficiently similar.

15. An apparatus for normalizing entry point instructions, the apparatus comprising:
   one or more processors; and
   a non-transitory machine-readable medium having stored thereon computer-executable instructions to cause the one or more processors to:
      receive a plurality of source instructions including an entry point of executable code;
      for each source instruction in the plurality of source instructions:
         parse the source instruction,
         determine whether the source instruction performs an effective operation, and
         in response to a determination that the source instruction does not perform an effective operation, mark the source instruction as ineffective; and
      filter one or more source instructions of the plurality of source instructions marked as ineffective such that the one or more source instructions are not copied to an output buffer.

16. The apparatus of claim 15, wherein the computer-executable instructions further comprise instructions to cause the one or more processors to:
   determine whether the source instruction discards an operation of a previous source instruction; and
   in response to a determination that the source instruction discards the operation of the previous source instruction, mark the previous source instruction as ineffective.

17. The apparatus of claim 15, wherein the computer-executable instructions further comprise instructions to cause the one or more processors to:
   determine whether the source instruction reverts an operation of a previous source instruction; and
   in response to a determination that the source instruction reverts the operation of the previous source instruction, mark the source instruction and the previous source instruction as ineffective.

18. The apparatus of claim 15, wherein the computer-executable instructions further comprise instructions to cause the one or more processors to:
   determine whether the source instruction comprises a jump instruction having a target address within the plurality of source instructions; and
   in response to a determination that the source instruction comprises the jump instruction having the target address within the plurality of source instructions, filter the jump instruction and source instructions between the jump instruction and the target address such that the jump instruction and source instructions between the jump instruction and the target address are not copied to the output buffer.

19. The apparatus of claim 15, wherein the computer-executable instructions further comprise instructions to cause the one or more processors to:
   determine whether the source instruction has a type associated with an ignored instruction; and
   in response to a determination that the source instruction has the type associated with an ignored instruction, filter the source instruction such that the source instruction is not copied to the output buffer.

20. The apparatus of claim 15, wherein the computer-executable instructions further comprise instructions to cause the one or more processors to:
   determine whether the source instruction contains an immediate or displacement; and
   in response to a determination that the source instruction contains the immediate or displacement, replace the immediate or displacement with a blind marker in the output buffer.

21. The apparatus of claim 15, wherein the computer-executable instructions further comprise instructions to cause the one or more processors to:
   compare the output buffer with a second output buffer associated with an executable containing known malware; and
   indicate that the executable code contains the known malware in response to a determination that the output buffer and the second output buffer are sufficiently similar.

* * * * *